Feb. 16, 1954

W. W. GARY, JR 2,669,595

ALKALINE BATTERY

Filed Dec. 18, 1950

INVENTOR.
WRIGHT W. GARY, JR.
BY
ATTORNEY.

Patented Feb. 16, 1954

2,669,595

UNITED STATES PATENT OFFICE 2,669,595

ALKALINE BATTERY

Wright W. Gary, Jr., Pasadena, Calif.

Application December 18, 1950, Serial No. 201,451

11 Claims. (Cl. 136—30)

This invention relates to an alkaline type of storage battery, and particularly to a battery having the couple of silver and zinc in an alkaline electrolyte.

The couple of silver and zinc has been long known for its dependability and efficiency in the primary "chloride of silver" cell. However, this cell is not feasible for many industrial applications because it cannot be recharged and used again, and has comparatively low voltage characteristics requiring a large number of cells per installation, thus making installation and maintenance costly.

Alkaline storage batteries making use of silver have been unsuccessful due to the difficulty of keeping the silver confined to the anode during charge and discharge. Colloidally fine silver oxide passes through perforate pockets, tubes, or gauze, and gradually poisons the cathode, shortening the life of the cell. The present invention employs a dialyzing membrane which effectively prevents the colloidal silver from being displaced. The "chloride of silver" cell, the primary cell using silver and zinc in a sal ammoniac electrolyte, has an E. M. F. of 1.02 volts. The well-known nickel-iron and nickel-cadmium cells have an E. M. F. of 1.1 to 1.2 volts. Thus, 98 and 83 cells respectively, would be required for a one hundred volt circuit. The E. M. F. of the present invention is 1.5 to 1.6 volts. The requirements would thus be reduced to 63 cells per one hundred volt circuit, a decided advantage where high voltages are desired.

Internal resistance of the "chloride of silver" cell is in the order of magnitude of four ohms per cell and nickel-iron and nickel-cadmium batteries are also high in internal resistance. This resistance can only be reduced by costly construction. The internal resistance of the present invention is less than 0.016 ohm per cell and construction is simple and inexpensive.

Another disadvantage in the use of silver is its susceptibility to passivity; that is, a theoretical monomolecular oxide film forming on the surface of the silver during rapid charge, thus preventing further oxidation or activity. Silver, if charged at a low rate, is easily oxidized in an alkaline electrolyte and passivity is introduced as the current density is increased. An example of this is, if a silver anode is charged at 50 ma. per square cm., the anode becomes passive; if charged at 20 ma. per square cm., the anode slowly regains activity; if charged at 40 ma. per square cm., periodic passivity is observed. In the present invention, this condition is improved by a novel cell construction, and, in cases where quick charge characteristics are desired, a small percent of an alkali-halogen catalyst may be added to the electrolyte. Due to this improved construction, AgO or $Ag_2O_2$ is formed on charge instead of $Ag_2O$, as experienced in prior attempts to devise a storage battery of this type. This permits less chemical to be used for the same ampere hour efficiency.

The present invention effectively uses metallic silver, silver oxide, or silver hydrate as the active anode coupled with any suitable cathode in an alkaline electrolyte. By a new construction, the silver is confined and passivity and internal resistance are reduced to a minimum in an economical manner. Size and weight, with respect to capacity, are also reduced.

The principal object of the invention, therefore, is to provide an improved silver-zinc storage battery.

Another object of the invention is to provide an improved construction to retain colloidal silver within the electrode of an alkaline battery.

A further object of the invention is to provide an alkaline battery construction which reduces passivity and internal resistance to a minimum.

A still further object of the invention is to provide a silver-zinc battery having high ampere hour output per unit weight.

Although the novel features which are believed to be characteristic of this invention will be pointed out with particularity in the appended claims, the manner of its organization and the mode of its operation will be better understood by referring to the following description, read in conjunction with the accompanying drawings, forming a part hereof, in which:

Figure 1:
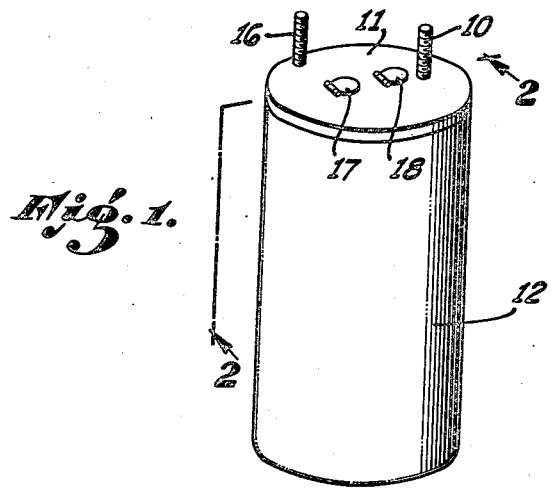
Fig. 1 is a perspective view of a battery embodying the invention.
Figure 2:
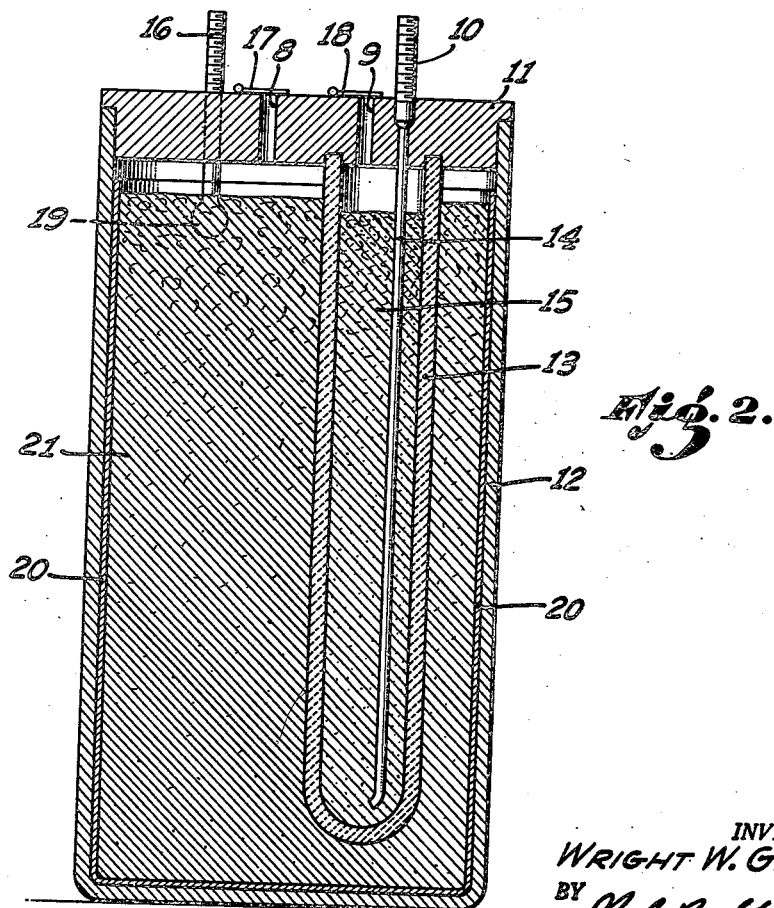
Fig. 2 is a cross-sectional view of the battery taken along the line 2—2 of Fig. 1.

Referring now to the drawings, in which like numerals identify the same elements, an external case 12, of cylindrical shape may be of suitable steel or plastic with a lining 20 of nickel foil or nickel plate. When the case is nickel plated, the first nickel deposit is annealed and then plated again. The lining 20 forms the conductor take-off from the negative electrode and may have a terminal extension 16 therefrom which is riveted to the lining 20 at 19 and embedded in the cover 11. Other forms of attachment of the terminal 16 may be made.

The positive electrode is shown as a nickel rod 14, but may also be in the form of a spiral nickel wire or a nickel foil. The end 10 of the rod 14 extends through the cover 11 to form the positive terminal. Surrounding the rod 14 and spaced therefrom, is a thimble 13, which is a dialyzing membrane of paper, suitable ceramic, or plastic, of such porosity that it will allow the free flow of electrolyte and yet prevent the escape of the colloidal silver. The open end of the thimble is attached to the cover 11.

The proper porosity of this thimble membrane 13 is critical. If porosity is too large, the silver will escape its confines, and, if too small, the internal resistance of the cell is obviously increased. One mode of achieving proper porosity is by impregnating a heavy weight filter paper with a saturated solution of magnesium sulfate, allowing the impregnated paper to dry, and then dipping the paper in an aqueous solution of sodium hydroxide. The membrane is then washed free of soluble salts. The resulting precipitate, residual in the matt of the membrane, sufficiently prevents silver displacement and allows free electrolyte flow. Certain thixotropic clays, natural or artificial, may be used to form said membrane in any well-known manner.

Within the thimble 13, is finely granulated or pelleted silver oxide 15, which is metallic silver when the battery in in discharged condition. Where high discharge rates are desired, nickel powder or flake may be added to the silver. The anode, thus described, is supplied with a check vent 18, over an opening 9, through cover 11, which will allow ready escape of liberated gases, yet prevent ingress of carbon dioxide-bearing atmosphere.

Between the thimble 13 and the negative take-off conductor 20, is metallic zinc dust 21, which forms the negative electrode. Although zinc is preferred, any suitable cathode material may be used. This zinc dust, during the first few cycles of charge and discharge, forms a porous rigid mass to which may be added, by mechanical mixing, mercury or mercury oxide for additional conductivity. If rigidity is neither necessary nor desired and semi-immobilization of the electrolyte is required, magnesium oxide or zinc oxide may be added to the zinc dust. Mercury may again be added to increase the conductivity. Whichever form of negative electrode is used depends upon the use to which the battery will be put.

The cell is then filled with potassium hydroxide electrolyte 1.22 to 1.25 sp. gr. at 18 degrees C., to which may be added a small percentage of an alkali-halogen compound, such as potassium bromide, for the reason mentioned above. The cathode, thus described, is supplied with a check vent 17 over opening 8 in cover 11, which will allow ready escape of liberated gases, yet prevent ingress of carbon dioxide-bearing atmosphere. However, there is little gasing on charge and the cell is virtually free from gasing on discharge. Although the battery has been shown in cylindrical shape, it is to be understood that it may be constructed in any desired shape and with any number of dialyzing plates or thimbles.

The addition of small percentages of an alkali-halogen compound, such as potassium bromide, to the electrolyte permits a more intensified current density than that obtainable in conventional cells using potassium hydroxide, sodium hydroxide, lithium hydroxide, or combinations thereof. This alkali-halogen functions as a catalyst to reduce passivity at high rates of charge, and does not enter into any permanent chemical reaction with the active chemicals.

The cell just described does not exhibit a rapid temperature rise at high charge rates, which is so common in alkaline batteries, and has been successfully operated at approximately 123 degrees F. without detrimental effects.

Although this is the preferred embodiment of the invention when silver is coupled with zinc, an equally applicable structural design will be found in my co-pending application, Ser. No. 192,873, filed October 30, 1950, where the silver may be mixed with the nickel salt before hydrogel precipitation, or the silver may be used alone as set forth in this co-pending application. This alternative design is especially desirable when the silver is coupled with iron or cadmium and where pressure is required for their increased efficiency. However, independent anode and cathode venting is necessary as well as the dialyzing membrane, as described above.

I claim:

1. A silver-zinc storage battery comprising a positive electrode having a nickel element, a negative electrode having a nickel element, a dialyzing membrane between said nickel elements, a silver oxide between said first nickel element and said membrane, zinc between said membrane and said second nickel element, and an electrolyte in which all of said elements are immersed, said electrolyte being potassium hydroxide, to which has been added an alkali-halogen compound.

2. A silver-zinc storage battery comprising a positive electrode having a nickel element, a negative electrode having a nickel element, a dialyzing membrane between said nickel elements, silver oxide between said first nickel element and said membrane, zinc between said membrane and said second nickel element, and an electrolyte in which all of said elements are immersed, said electrolyte being potassium hydroxide, to which has been added potassium bromide.

3. A silver-zinc storage battery comprising a positive electrode having a nickel element, a negative electrode having a nickel element, a dialyzing membrane between said nickel elements, silver oxide between said first nickel element and said membrane, zinc between said membrane and said second nickel element, and an electrolyte in which all of said elements are immersed, said membrane being a heavy weight filter paper which has been impregnated with a solution of a magnesium salt internally precipitated and having a porosity such as to permit the free flow of said electrolyte and not the flow of colloidal silver.

4. A silver-zinc storage battery comprising a casing, a nickel lining for said casing, a nickel element surrounded by said casing, a porous dialyzing membrane surrounding said nickel element and spaced therefrom and from said lining, pelleted silver oxide between and in contact with said membrane and said nickel element, metallic zinc between and in contact with said membrane and said lining, an electrolyte in which all of said elements are immersed, said zinc being in dust form, the liberated gases therefrom being separated from the liberated gases from said silver oxide within said casing, a cover having a one-way gas outlet opening above said silver oxide, and a separate one-way gas outlet opening above said zinc is provided for said casing.

5. A silver-zinc storage battery comprising a casing, a nickel lining for said casing, a nickel element surrounded by said casing, a porous dialyzing membrane surrounding said nickel element and spaced therefrom and from said lining, pelleted silver oxide between and in contact with said membrane and said nickel element, metallic zinc between and in contact with said membrane and said lining, and an electrolyte in which all of said elements are immersed, said zinc being in dust form to which magnesium oxide has been mixed, and said electrolyte being potassium hydroxide to which has been added a small percentage of an alkali-halogen compound.

6. A silver-zinc storage battery comprising a membrane, granulated silver oxide on one side and in contact with said membrane, and metallic zinc dust on the other side and in contact with said membrane, said membrane being of heavy weight filter paper which has been impregnated with a saturated solution of magnesium sulfate, allowed to dry, dipped in an aqueous solution of sodium hydroxide, and washed.

7. A membrane for preventing passage of colloidal silver and permitting the flow of potassium hydroxide comprising a heavy filter paper having a magnesium hydroxide precipitate in the matt of said paper.

8. The method of forming a dialyzing membrane which permits the flow of a battery electrolyte and prevents the flow of colloidal silver comprising impregnating a heavy weight filter paper with a saturated solution of magnesium sulfate, drying said impregnated paper, dipping said impregnated paper in an aqueous solution of sodium hydroxide, and washing said dipped paper free of soluble salts.

9. A membrane for filtering colloidal suspensions from liquids containing said suspensions, comprising a heavy weight filter paper which has been impregnated with a solution of a magnesium salt internally precipitated.

10. The method of forming a membrane for filtering colloidal suspensions from liquids containing said suspensions, comprising impregnating a heavy weight filter paper with a solution of a magnesium salt and internally precipitating said salt.

11. A silver-zinc storage battery, comprising a membrane, silver oxide on one side and in contact with said membrane, and metallic zinc on the other side and in contact with said membrane, said membrane being of heavy filter paper having a magnesium precipitate in the matt of said paper.

WRIGHT W. GARY, Jr.

References Cited in the file of this patent

UNITED STATES PATENTS

| Number | Name | Date |
|---|---|---|
| 457,116 | Hard | Aug. 4, 1891 |
| 942,279 | Perry | Dec. 7, 1909 |
| 1,004,530 | Creighton | Sept. 26, 1911 |
| 1,451,003 | Wood | Apr. 10, 1923 |
| 2,317,711 | Andre | Apr. 27, 1943 |
| 2,451,805 | Callinan | Oct. 19, 1948 |
| 2,542,710 | Ruben | Feb. 20, 1951 |
| 2,601,133 | Yardeny | June 17, 1952 |

FOREIGN PATENTS

| Number | Country | Date |
|---|---|---|
| 324,918 | Great Britain | Feb. 5, 1930 |

OTHER REFERENCES

Denison, Transactions of the Electro-chemical Society, vol. 90, 1946, pgs. 387–401.